United States Patent
Lin et al.

(10) Patent No.: US 8,174,654 B2
(45) Date of Patent: May 8, 2012

(54) WIRING STRUCTURE OF LIQUID CRYSTAL DISPLAY DEVICE AND LIQUID CRYSTAL DISPLAY DEVICE

(75) Inventors: Yen-fen Lin, Taipei County (TW); Han-tung Hsu, Taoyuan County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 0 days.

(21) Appl. No.: 13/296,467

(22) Filed: Nov. 15, 2011

(65) Prior Publication Data

US 2012/0057089 A1 Mar. 8, 2012

Related U.S. Application Data

(63) Continuation-in-part of application No. 12/496,445, filed on Jul. 1, 2009.

(30) Foreign Application Priority Data

Mar. 26, 2009 (TW) ................................ 98204804 U

(51) Int. Cl.
*G02F 1/1343* (2006.01)
*G02F 1/1345* (2006.01)
(52) U.S. Cl. .................... 349/139; 349/149; 349/151
(58) Field of Classification Search .......... 349/139, 349/149, 150, 151, 152; 174/250, 260; 257/734, 257/735, E23.01, E23.06, E23.141, E23.179; 345/87, 204, 205, 206
See application file for complete search history.

(56) References Cited

U.S. PATENT DOCUMENTS 6,657,606 B2 * 12/2003 Kang et al. ............... 345/87
6,717,629 B2    4/2004 Sumi et al.

* cited by examiner

*Primary Examiner* — Dung Nguyen
*Assistant Examiner* — Tai Duong
(74) *Attorney, Agent, or Firm* — Morris Manning & Martin LLP; Tim Tingkang Xia, Esq.

(57) ABSTRACT

A wiring structure of a liquid crystal display device and a liquid crystal display device are disclosed. The wiring structure of the liquid crystal display device includes a substrate, plural electrical elements, and plural wirings. The electrical elements are disposed on the substrate to generate plural electrical signals. The wirings are coupled to the electrical elements to transmit the electrical signals. The wirings include inner wirings and an outermost peripheral wiring. The outermost peripheral wiring and the inner wirings have different wiring patterns. Each of the electrical elements is positioned at a side of the outermost peripheral wiring facing the center of the substrate. After the liquid crystal display device is cut and polished, by distinguishing the wiring patterns of both the outermost peripheral wiring and the inner wirings, the existence of the outermost peripheral wiring shows that the outermost peripheral wiring is not polished and removed.

9 Claims, 4 Drawing Sheets

WIRING STRUCTURE OF LIQUID CRYSTAL DISPLAY DEVICE AND LIQUID CRYSTAL DISPLAY DEVICE

CROSS REFERENCE TO RELATED APPLICATION

This application is a continuation-in-part of U.S. patent application Ser. No. 12/496,445, filed on Jul. 1, 2009, which is incorporated herein by reference in its entirety, and which itself claims priority under 35 U.S.C.§119(a) on Patent Application No. 098204804 filed in Taiwan, R.O.C. on Mar. 26, 2009, which is incorporated herein by reference in its entirety.

TECHNICAL FIELD OF THE INVENTION

The present invention relates to a wiring structure, and more particularly to a wiring structure of a liquid crystal display device which can easily be distinguished.

BACKGROUND OF THE INVENTION

A conventional wiring structure around the edges of a liquid crystal display device is a straight-line pattern. However, the development of the liquid crystal display device is progressing toward the widescreen types, therefore the edge areas for wirings are narrower than before. In addition, according to design with increased substrate utilization rate, distances between the wirings of the liquid crystal display device are closer. In another aspect, design of a gate driving integrated circuit (IC) tends to be chip on glass (COG), that is, the driving integrated circuit is manufactured on an array substrate. Timing signals are transmitted via the wirings from a source driving integrated circuit to the gate driving integrated circuit. In order to prevent the timing signals from distortion, the wiring areas are enlarged for reducing resistance. However, because the areas inside the liquid crystal display device are limited, the wirings are often closer to the edges being cut and polished.

A glass substrate is usually cut into a plurality of display panels, for example, six pieces of display panels. Accordingly, the glass substrate needs to be proceeded with the cutting process for separating into the display panels. The display panels will have sharp edges after the glass substrate is cut, and the sharp edges need to be polished when considering the stress and safety of the workers. The wirings around the edges of the display panel still remain a straight-line pattern before and after the edges of the display panel are polished, so it is difficult for the workers to distinguish a border of the wirings around the edges of the display panel. Please refer to FIG. 1A and FIG. 1B. FIG. 1A illustrates a liquid crystal display device 100 before panel edges thereof are polished. FIG. 1B illustrates the liquid crystal display device 100 after panel edges thereof are polished. When the liquid crystal display device 100 proceeds to be polished, wiring areas are too easily polished and removed. As a result, a part of an outermost peripheral wiring 102 in FIG. 1A is polished and removed or the outermost peripheral wiring 102 is totally polished and removed as shown in FIG. 1B. Resistance of the wiring areas is accordingly changed to affect output signals, and display quality of the liquid crystal display device 100 is thus abnormal.

The conventional method to prevent the outermost peripheral wiring from being polished and removed is to make a mark at a specific position of each side of the liquid crystal display device. Then, each mark is utilized to indicate a polished edge of each side of the liquid crystal display device. The conventional method has to add a step of making the mark in the manufacturing processes of the liquid crystal display device, and only the wirings adjacent to the marks at the specific positions will not be polished and not be removed, however, the other wirings which are not adjacent to the marks might still be polished and removed.

Therefore, there is a need to solve the above-mentioned problem that the straight-line pattern wirings of the liquid crystal display device are not easily distinguishable and thus polished and removed. The above-mentioned problem affects the output signals and leads to the abnormal display quality of the liquid crystal display device.

SUMMERY OF THE INVENTION

A primary objective of the present invention is to provide a wiring structure of a liquid crystal display device, such that the wiring structure can easily be viewed and distinguished before and after the liquid crystal display device is cut and polished. As a result, it can easily be distinguished whether the wiring structure of the liquid crystal display device is polished and removed.

The wiring structure of the liquid crystal display device according to the present invention comprises a substrate, a plurality of electrical elements, and a plurality of wirings. The electrical elements are disposed on the substrate to generate a plurality of electrical signals for displaying an image. The wirings are coupled to the electrical elements to transmit the electrical signals. The wirings comprise a plurality of inner wirings and an outermost peripheral wiring. The outermost peripheral wiring has a wiring pattern which is different from that of the inner wirings. Each of the electrical elements is positioned at a side of the outermost peripheral wiring facing the center of the substrate. The outermost peripheral wiring which is disposed between two ends of each side of the liquid crystal display device is a curve pattern. The curve pattern is a uniform pattern or a non-uniform pattern. The uniform pattern is one selected from a group consisting of square wave pattern, semi-circular pattern, triangular pattern, wave pattern, trapeziform pattern, and polygonal pattern.

The outermost peripheral wiring and the inner wirings have different wiring patterns according to the wiring structure of the present invention liquid crystal display device. After the liquid crystal display device is cut and polished, the workers can easily know whether the wiring areas are changed or not by distinguishing the wiring patterns of both the outermost peripheral wiring and the inner wirings are still different. If the wiring patterns of both the outermost peripheral wiring and the inner wirings are the same, that means the outermost peripheral wiring is polished and removed. As a result, it can be deduced that the output signals via the wirings will be affected, hence, abnormal display quality of the liquid crystal display device can be avoided.

DETAILED DESCRIPTION OF THE INVENTION

Figure 1A:
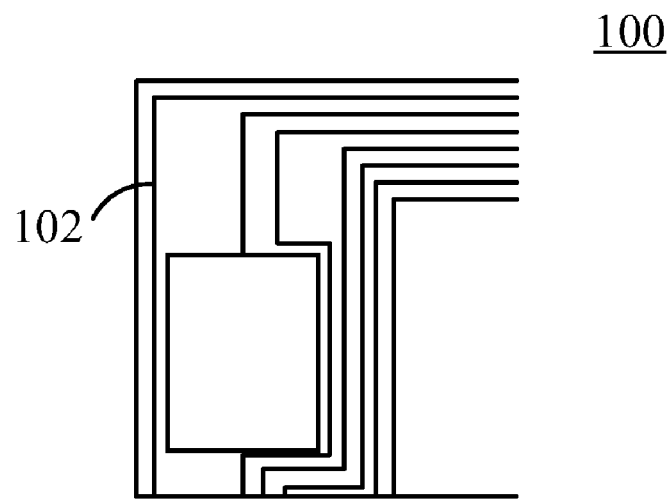
FIG. 1A illustrates a liquid crystal display device before panel edges thereof are polished.
Figure 1B:
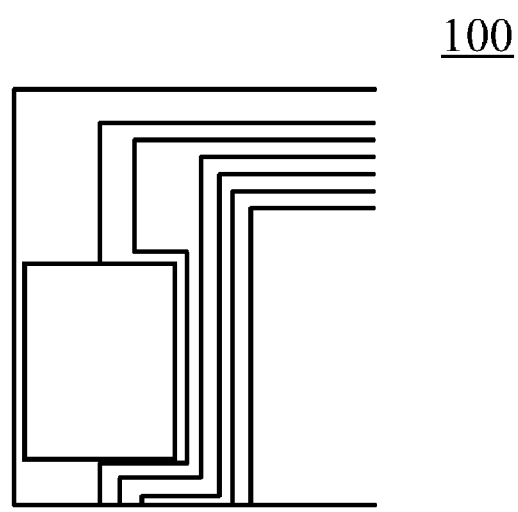
FIG. 1B illustrates the liquid crystal display device after panel edges thereof are polished.
Figure 2:
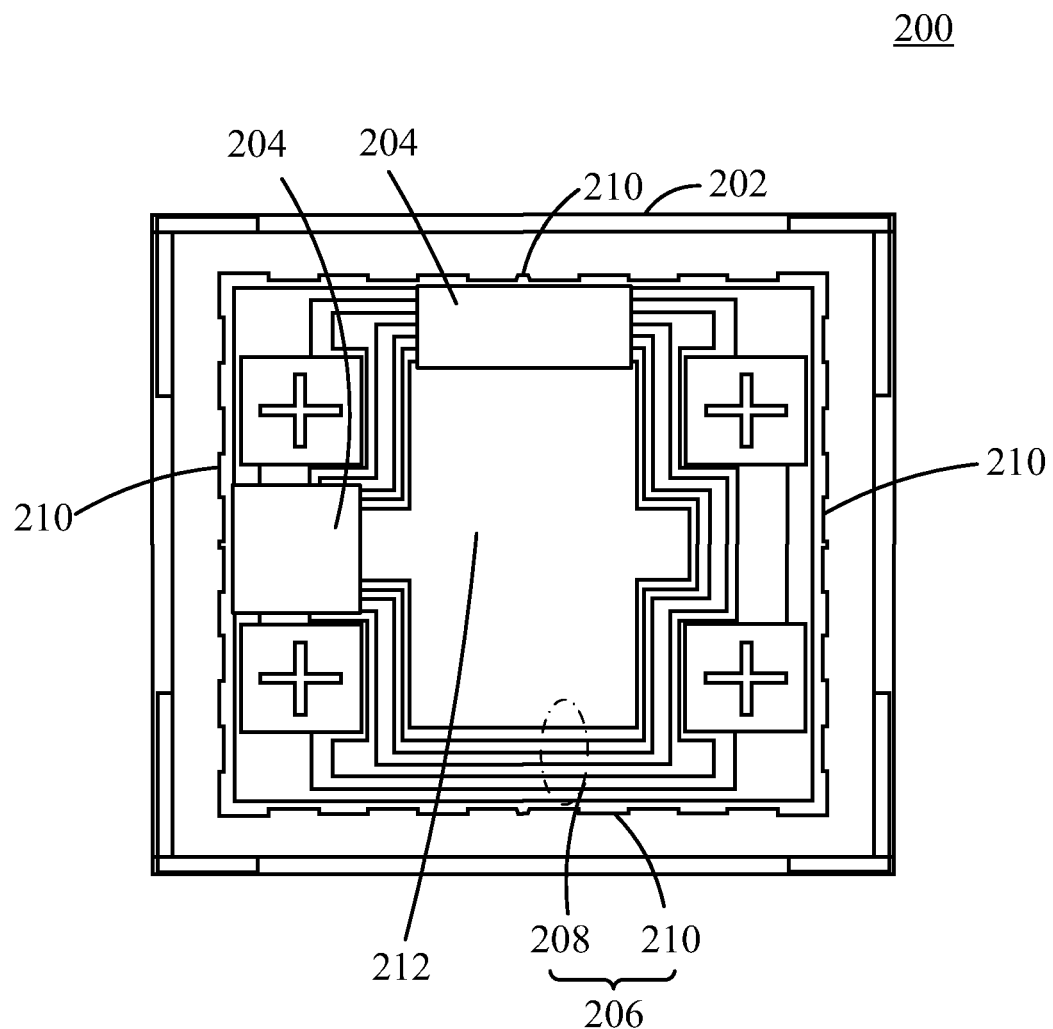
FIG. 2 illustrates a wiring structure of a liquid crystal display device according to a first embodiment of the present invention.

Please refer to FIG. 2. FIG. 2 illustrates a wiring structure of a liquid crystal display device 200 according to a first embodiment of the present invention. The wiring structure of the liquid crystal display device 200 comprises a substrate 202, a plurality of electrical elements 204, and a plurality of wirings 206. The substrate 202 is a glass substrate. The electrical elements 204 are disposed on the substrate 202 to generate a plurality of electrical signals for displaying an image. The electrical elements 204 comprise at least one gate driving circuit and at least one source driving circuit. In one embodiment, the gate driving circuit is a gate driving integrated circuit which is disposed on the substrate 202, and the source driving circuit is a source driving integrated circuit which is disposed on the substrate 202. In another embodiment, the gate driving circuit is manufactured on the substrate 202. The wirings 206 are coupled to the electrical elements 204 to transmit the electrical signals. The wirings 206 comprise a plurality of inner wirings 208 and an outermost peripheral wiring 210. Each of the electrical elements 204 is positioned at a side of the outermost peripheral wiring 210 facing the center 212 of the substrate 202. The outermost peripheral wiring 210 has a wiring pattern which is different from that of the inner wirings 208. The outermost peripheral wiring 210 which is disposed between two ends of each side of the liquid crystal display device 200 is a curve pattern, that is, not a straight-line pattern. For example, the wiring pattern of the outermost peripheral wiring 210 which is disposed between two ends of each side of the liquid crystal display device is a square wave pattern. The curve pattern is a uniform pattern or a non-uniform pattern. The outermost peripheral wirings 210 of the four sides of the liquid crystal display device 200 are uniform patterns, e.g. a uniform square wave pattern. Each outermost peripheral wiring 210 has a midpoint. The wiring patterns on both sides of the midpoint are symmetrical.

Figure 3A:
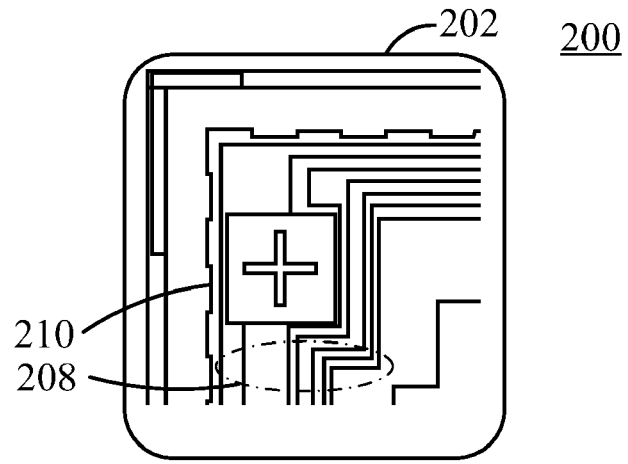
FIG. 3A illustrates a diagram representing one corner of the wiring structure of the liquid crystal display device shown in FIG. 2 before the edges of the liquid crystal display device are polished.
Figure 3B:
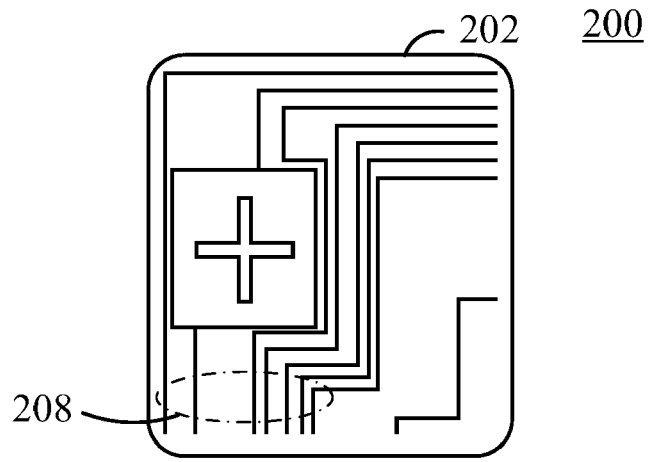
FIG. 3B illustrates a diagram representing the outermost peripheral wiring in FIG. 3A which has been polished and removed.
Figure 3C:
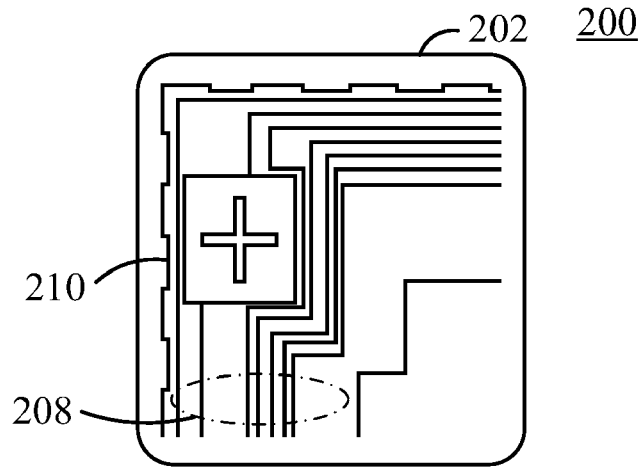
FIG. 3C illustrates a diagram representing the outermost peripheral wiring shown in FIG. 3A which is not removed after the edges of the liquid crystal display device are polished.

Please refer to FIG. 3A to FIG. 3C. FIG. 3A illustrates a diagram representing one corner of the wiring structure of the liquid crystal display device 200 shown in FIG. 2 before the edges of the liquid crystal display device are polished. FIG. 3B illustrates a diagram representing the outermost peripheral wiring 210 shown in FIG. 3A which has been polished and removed. FIG. 3C illustrates a diagram representing the outermost peripheral wiring 210 shown in FIG. 3A which is not removed after the edges of the liquid crystal display device are polished. To achieve the purpose of easily distinguishing whether or not the wirings of the edges are polished and removed, it is understood and easily distinguished from FIG. 3A that the outermost peripheral wiring 210 has a wiring pattern different from that of the inner wirings 208. If the outermost peripheral wiring 210 in FIG. 3A is polished and removed as shown in FIG. 3B, that is, the remaining outermost peripheral wiring and the inner wirings 208 have the same wiring pattern, i.e. a straight-line pattern, this represents that a part of the outermost peripheral wiring 210 or the total part of the outermost peripheral wiring 210 has been polished and removed. Resistance of the outermost peripheral wiring 210 is thus changed, therefore, it is not the original resistance of the outermost peripheral wiring 210. The workers can easily distinguish polished edges by viewing with their eyes or utilizing a microscope to deduce that the display quality of the liquid crystal display device 200 might be abnormal. In contrast, when the outermost peripheral wiring 210 and the inner wirings 208 still have different wiring patterns as shown in FIG. 3C after the liquid crystal display device 200 in FIG. 3A is polished, this represents the outermost peripheral wiring 210 is not polished and not removed. Accordingly, the display quality of the liquid crystal display device 200 might not be affected by the polishing process.

Figure 4:
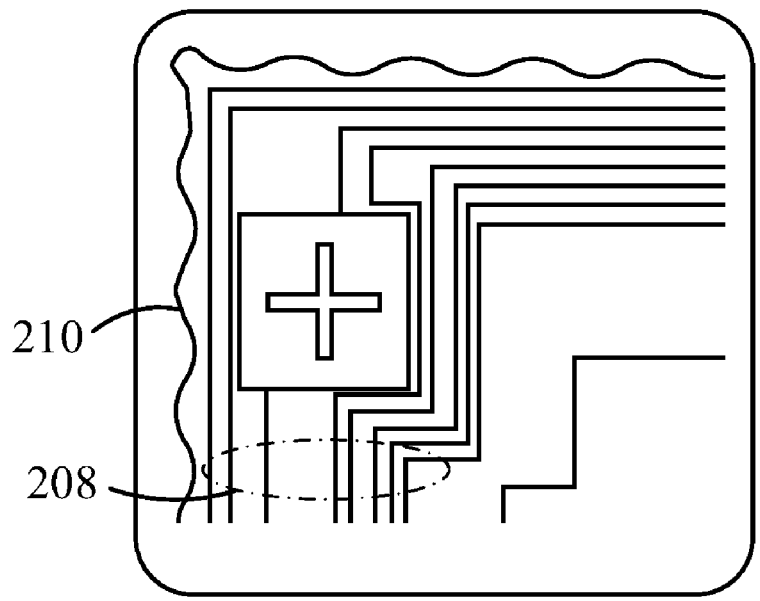
FIG. 4 illustrates a wiring structure of a liquid crystal display device according to a second embodiment of the present invention.
Figure 5:
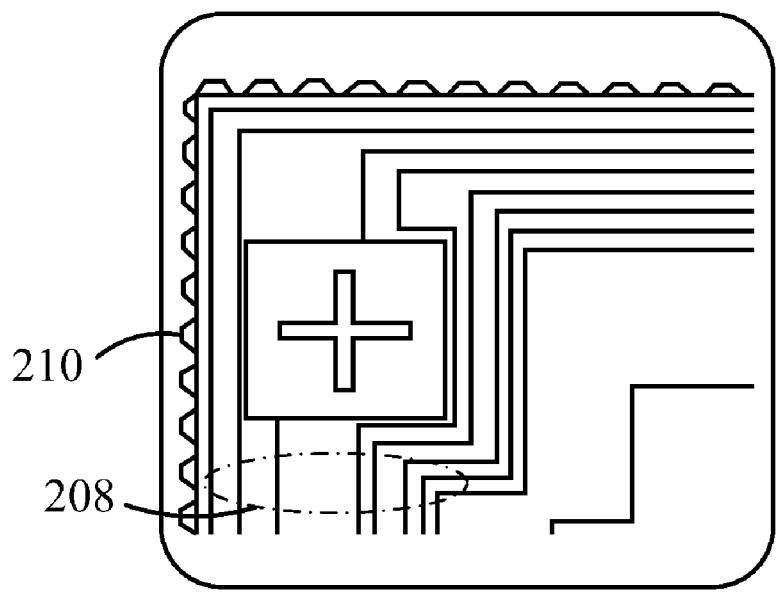
FIG. 5 illustrates a wiring structure of a liquid crystal display device according to a third embodiment of the present invention.

Please refer to FIG. 4. FIG. 4 illustrates a wiring structure of a liquid crystal display device 200 according to a second embodiment of the present invention. The wiring pattern of the outermost peripheral wiring 210 in FIG. 4 is a wave pattern. Since the primary objective of the present invention is to be able to easily distinguish the wiring pattern of the outermost peripheral wiring 210 from that of the inner wirings 208 after the liquid crystal display device 200 is cut and polished, as long as the outermost peripheral wiring 210 has a wiring pattern different from that of the inner wirings 208, the primary objective of the present invention can be achieved. Please refer to FIG. 5. FIG. 5 illustrates a wiring structure of a liquid crystal display device 200 according to a third embodiment of the present invention. In the present embodiment, the wiring pattern of the outermost peripheral wiring 210 is formed by a plurality of trapeziform patterns, and an interval between adjacent trapeziform patterns is a specific distance.

The outermost peripheral wiring 210 in the above-mentioned embodiments is a uniform pattern. However, other than the uniform patterns shown in FIG. 2, and FIGS. 4-5, the uniform pattern can also be one selected from a group consisting of semi-circular pattern, triangular pattern, polygonal pattern, and any other geometric patterns. Of course, the outermost peripheral wiring 210 can be a non-uniform pattern. As long as the wiring pattern of the outermost peripheral wiring 210 is different from that of the inner wirings 208, the primary objective of the present invention can be achieved.

The outermost peripheral wiring 210 and the inner wirings 208 are made of metal for transmitting the electrical signals as mentioned above. The electrical elements 204 comprise the gate driving integrated circuit, the source driving integrated circuit, and other elements and/or circuit boards needed by the liquid crystal display device 200 to display an image. The gate driving integrated circuit is utilized for driving pixels. The source driving integrated circuit is utilized for outputting display signals to the pixels.

The outermost peripheral wiring and the inner wirings have different wiring patterns according to the wiring structure of the liquid crystal display device of the present invention. After the liquid crystal display device is cut and polished, the workers can easily distinguishing whether the wiring areas are changed or not by viewing the wiring patterns of both the outermost peripheral wiring and the inner wirings are still different. If the wiring patterns of both the outermost peripheral wiring and the inner wirings are the same, that means the outermost peripheral wiring is polished and removed. As a result, it can be deduced that the output signals via the wirings will be affected. Therefore, abnormal display quality of the liquid crystal display device can be avoided. Furthermore, the wiring pattern of the outermost peripheral wiring can be regarded as a mark when the liquid crystal display device is cut and polished. Therefore, the step of making an additional mark at a specific position in the conventional methods can be omitted. Because the outermost peripheral wiring and the inner wirings have different wiring patterns, the workers can easily distinguish whether the outermost peripheral wiring is polished and removed or not. In contrast, only wirings adjacent to the marks at the specific positions can be distinguished in the conventional methods. Finally, when mura occurs in some areas of the liquid crystal display device, the wiring patterns adjacent to the mura in the areas can be distinguished first for identifying whether the wiring patterns adjacent to the mura in the areas are polished and removed. That is, the areas of mura can be fastly identified.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. A wiring structure of a liquid crystal display device, comprising:
    a substrate;
    a plurality of electrical elements disposed on the substrate, for generating a plurality of electrical signals for displaying an image;
    a plurality of wirings coupled to the electrical elements, for transmitting the electrical signals,
    wherein the wirings comprise a plurality of inner wirings and an outermost peripheral wiring, the outermost peripheral wiring has a wiring pattern different from that of the inner wirings, and each of the electrical elements is positioned at a side of the outermost peripheral wiring facing the center of the substrate.

2. The wiring structure of the liquid crystal display device of claim 1, wherein the outermost peripheral wiring between two ends of each side of the liquid crystal display device is a curve pattern.

3. The wiring structure of the liquid crystal display device of claim 2, wherein the curve pattern is a uniform pattern.

4. The wiring structure of the liquid crystal display device of claim 3, wherein the uniform pattern is one selected from a group consisting of square wave pattern, semi-circular pattern, triangular pattern, wave pattern, trapeziform pattern, and polygonal pattern.

5. The wiring structure of the liquid crystal display device of claim 1, wherein the inner wirings are made of metal.

6. The wiring structure of the liquid crystal display device of claim 1, wherein the outermost peripheral wiring is made of metal.

7. The wiring structure of the liquid crystal display device of claim 1, wherein the electrical elements comprise at least one gate driving circuit.

8. The wiring structure of the liquid crystal display device of claim 1, wherein the electrical elements comprise at least one source driving circuit.

9. A liquid crystal display device comprising the wiring structure of the liquid crystal display device of claim 1.

* * * * *